United States Patent
Hartsfield, Jr. et al.

(10) Patent No.: US 6,941,638 B2
(45) Date of Patent: Sep. 13, 2005

(54) INTERCONNECTING METHOD FOR SEGMENTED STATOR ELECTRIC MACHINES

(75) Inventors: Richard E. Hartsfield, Jr., Chesterfield, MO (US); Gary E. Horst, Manchester, MO (US); Dennis M. Hurst, Florissant, MO (US); Kent A. Sheeran, Festus, MO (US)

(73) Assignee: Emerson Electric Co., St. Louis, MO (US)

( * ) Notice: Subject to any disclaimer, the term of this patent is extended or adjusted under 35 U.S.C. 154(b) by 147 days.

(21) Appl. No.: 10/193,515

(22) Filed: Jul. 11, 2002

(65) Prior Publication Data

US 2004/0006865 A1 Jan. 15, 2004

(51) Int. Cl.[7] .................... H02K 15/00; H02K 15/14; H02K 15/16
(52) U.S. Cl. ............ 29/596; 29/597; 29/598; 29/609; 29/735; 29/854; 29/857; 310/71; 310/156.01; 310/156.43
(58) Field of Search .................... 29/596, 597, 598, 29/609, 735, 854, 857; 310/71, 156.01, 156.43

(56) References Cited

U.S. PATENT DOCUMENTS

| | | | |
|---|---|---|---|
| 2,688,103 A | * | 8/1954 | Sheldon ................. 310/254 |
| 3,947,080 A | | 3/1976 | Ege |
| 4,071,793 A | | 1/1978 | Cox |
| 4,090,098 A | | 5/1978 | Kranzler et al. |
| 4,177,397 A | | 12/1979 | Lill |
| 4,260,917 A | | 4/1981 | Lundin et al. |
| 4,283,105 A | | 8/1981 | Ferrill et al. |
| 4,484,096 A | | 11/1984 | Sauerwein et al. |
| 4,563,053 A | | 1/1986 | Pavel |
| 4,605,275 A | | 8/1986 | Pavel |
| 4,765,054 A | | 8/1988 | Sauerwein et al. |
| 4,790,778 A | | 12/1988 | Seidenbusch |
| 5,320,558 A | | 6/1994 | von Roretz |
| 5,425,080 A | | 6/1995 | Abbie |
| 5,484,306 A | | 1/1996 | Mawby et al. |
| 5,506,379 A | | 4/1996 | McLean, Jr. et al. |
| 5,614,757 A | | 3/1997 | Person et al. |
| 5,729,072 A | | 3/1998 | Hirano et al. |
| 5,860,829 A | | 1/1999 | Hower et al. |
| 5,949,613 A | | 9/1999 | Moir et al. |
| 5,953,281 A | | 9/1999 | Matoba |
| 6,088,738 A | | 7/2000 | Okada |
| 6,127,753 A | * | 10/2000 | Yamazaki et al. ............ 310/71 |
| 6,210,208 B1 | | 4/2001 | Barnes et al. |
| 6,216,161 B1 | | 4/2001 | Feigenbaum et al. |
| 6,573,632 B2 | * | 6/2003 | Hsu ........................ 310/216 |
| 2002/0084716 A1 | | 7/2002 | Harter et al. |

* cited by examiner

*Primary Examiner*—Carl J. Arbes
*Assistant Examiner*—Tim Phan
(74) *Attorney, Agent, or Firm*—Harness, Dickey & Pierce. P.L.C.

(57) ABSTRACT

A method of connecting phases of a segmented stator electric machine includes providing a stator core. An end cap assembly is attached to the stator core. Winding wire is wound around the end cap assembly and the stator core to form a stator segment assembly. A plurality of the stator segment assemblies are assembled into a stator including first, second and third phases. A phase wire stitching machine is used to connect opposite ends of the winding wire of each of the stator segment assemblies to form the first, second and third phases of the stator. The phase wires can be attached to the stator segment assemblies using terminals, IDCs, hook terminals, and/or directly to the winding wire.

10 Claims, 7 Drawing Sheets

INTERCONNECTING METHOD FOR SEGMENTED STATOR ELECTRIC MACHINES

FIELD OF THE INVENTION

The present invention relates to electric machines, and more particularly to an improved interconnection method for phase wires of a segmented stator electric machine.

BACKGROUND OF THE INVENTION

Electric machines, such as motors and generators, typically include a stator that is mounted inside a housing and a rotor that is supported for rotation relative to the stator. There are several conventional methods for placing the winding wire on the stator teeth of non-segmented electric machines. A transfer winding method involves initially winding the wire and then transferring the pre-wound wire onto the stator teeth. Transfer winding tends to leave excess winding wire or loops around axial ends of the stator teeth. Transfer winding can typically utilize approximately 60–65% of available stator slot area.

When multiple phases of the electric machine are interconnected using transfer winding, the winding wire for teeth associated with one polarity of one phase are typically wound using a continuous wire and then transferred onto the corresponding stator teeth. As a result, the cost of separately connecting the phase wires to the winding wire can be avoided.

A needle winding method employs a needle that winds the wire directly on the stator teeth. The needle, however, takes up some of the stator slot area, which reduces slot fill to approximately 50% for non-segmented stators. When multiple phases of the electric machine are interconnected using needle winding, the winding wire for teeth associated with one polarity of one phase are also typically wound using a continuous wire to eliminate the cost of connecting the phase wires to the winding wires.

To improve slot fill and other characteristics of the electric machine, some manufacturers have split the stator into multiple stator segment assemblies. Each stator segment assembly typically includes one stator tooth. The individual stator segment assemblies of segmented stator electric machines are usually wound individually. For example, the stator segment assemblies of some brushless permanent magnet electric machines include an end cap assembly that is attached to a segmented stator core. Winding wire is wound around the end cap assembly and the stator core. Some switched reluctance electric machines also include a segmented stator.

Opposite ends of the winding wire for each stator segment assembly are typically wound around terminals that are integrated with the end cap assembly. When using segmented stators, the stator segment assemblies are manually interconnected to form first, second and third phases of the electric machine. This approach has relatively high labor cost.

Other approaches include using printed circuit boards (PCB) or lead frames to connect the terminals or IDCs. Both PCBs and IDCs have a relatively high cost. PCBs also have limited heat dissipation, which may pose a problem for low voltage electric machines with higher current levels. Lead frames require a substantial amount of space and require a multiple step manufacturing process such as stamping or molding.

SUMMARY OF THE INVENTION

A method of connecting phases of a segmented stator electric machine according to the present invention includes providing a stator core. An end cap assembly is located adjacent to the stator core. Winding wire is wound around the end cap assembly and the stator core to form a stator segment assembly. A plurality of the stator segment assemblies are assembled into a stator. A phase wire stitching device is used to interconnect opposite ends of the winding wire of each of the stator segment assemblies to form first, second and third phases of the stator.

In other features, first and second terminals are attached to the end cap assemblies of the stator segment assemblies. The opposite ends of the winding wire are connected to the first and second terminals. The phase wires are connected to the first and second terminals of the stator segment assemblies using the phase wire stitching device.

In yet other features, single-sided insulation displacement connectors (IDCs) are attached to the end cap assemblies of the stator segment assemblies. The opposite ends of the winding wire are connected to the IDCs. The phase wires are also connected to the IDCs of the stator segment assemblies using the phase wire stitching device.

In still other features, double-sided insulation displacement connectors (IDCs) having first and second sides are attached to the end cap assemblies of the stator segment assemblies. The opposite ends of the winding wire are connected to the first side of the IDCs. The phase wires are connected to the second side of the IDCs of the stator segment assemblies using the phase wire stitching device.

In still other features, first and second hook terminals are attached to the end cap assemblies of the stator segment assemblies. The opposite ends of the winding wire are connected to the first and second hook terminals. The phase wires are connected to the first and second hook terminals of the stator segment assemblies using the phase wire stitching device.

In yet other features, a position of the phase wire stitching device is adjusted relative to the stator while connecting the phase wires. Alternately, a position of the stator is adjusted relative to the phase wire stitching device while connecting the phase wires.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
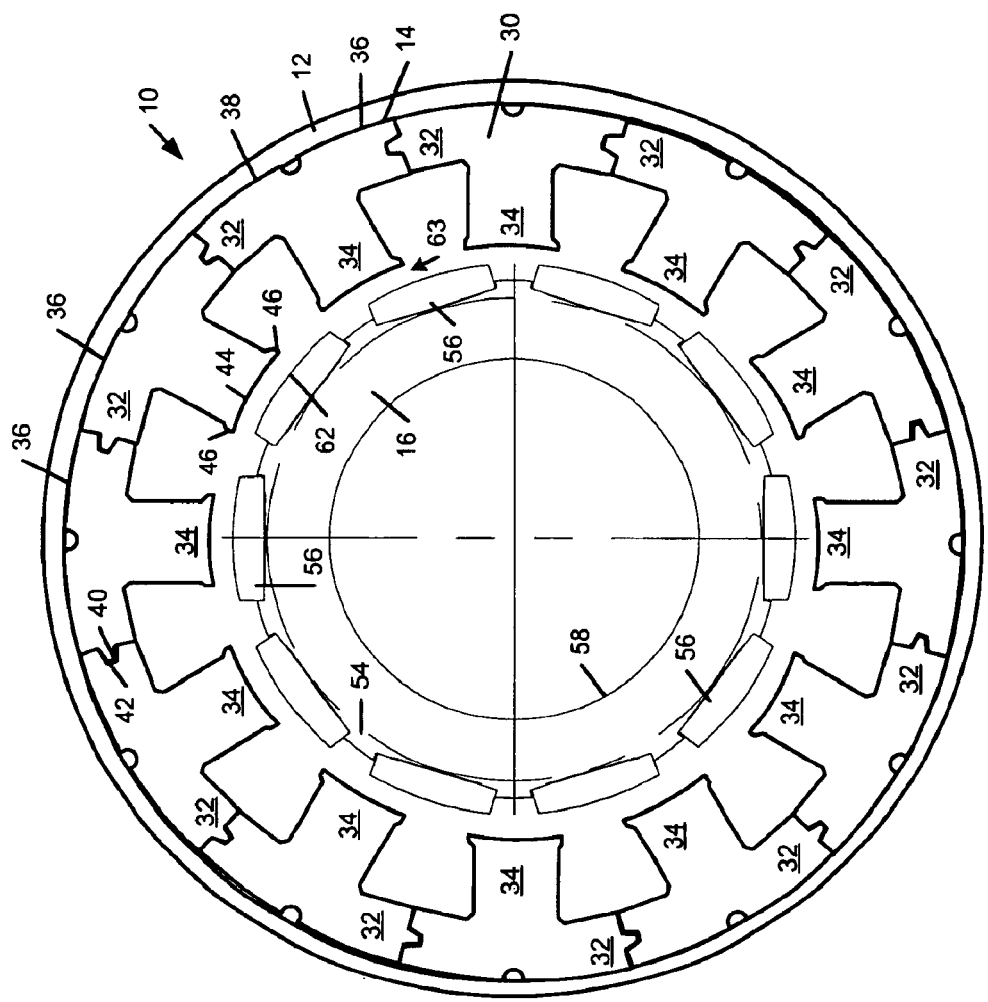
FIG. 1 is a partial cross-sectional view showing a segmented stator, a rotor and a housing of an exemplary electric machine.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, an exemplary brushless permanent magnet electric machine 10 is shown. The electric machine 10 includes a housing 12 and a segmented stator 14 mounted in the housing 12. A rotor 16 is supported for rotation relative to the segmented stator 14. While the present invention will be described in conjunction with brushless permanent magnet electric machines, the present invention may also be used with other types of segmented stator electric machines such as switched reluctance electric machines. For additional details concerning segmented stator switched reluctance electric machines, see U.S. Pat. Ser. Nos. 09/803,876, Filed Mar. 12, 2001, "Segmented Stator Switched Reluctance Machine", and 09/754,537, Filed Jan. 4, 2001, "End Cap Assembly for a Switched Reluctance Electric Machine", which are hereby incorporated by reference.

Figure 2:
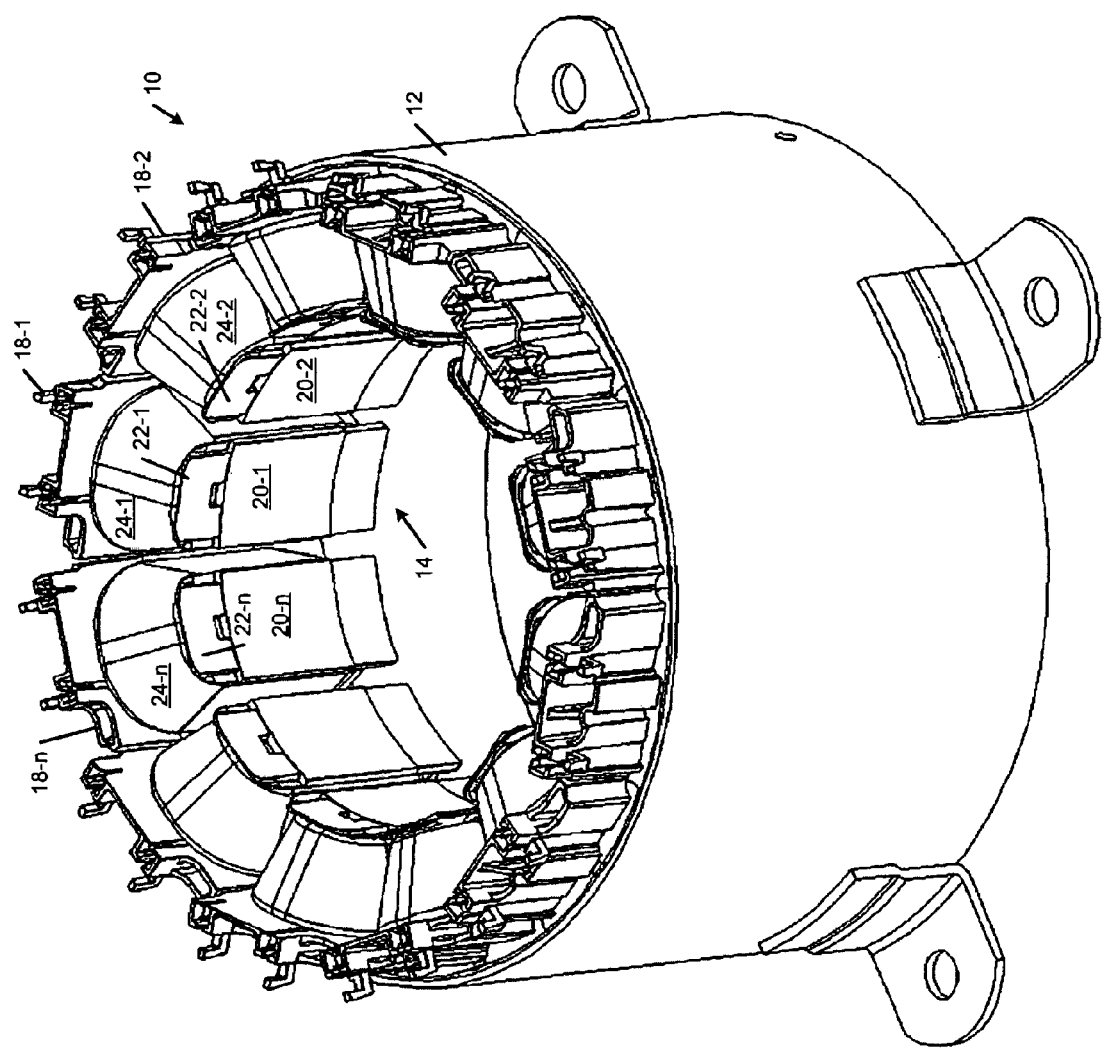
FIG. 2 is a perspective view of an assembled segmented stator electric machine with the rotor omitted.

Referring now to FIG. 2, the segmented stator 14 includes a plurality of stator segment assemblies 18-1, 18-2, . . . , and 18-n (collectively referred to as 18) that are assembled inside of the housing 12. The stator segment assemblies 18-1, 18-2, . . . , and 18-n include stator segment cores 20-1, 20-2, . . . , and 20-n and end cap assemblies 22-1, 22-2, . . . , and 22-n. Winding wire 24-1, 24-2, . . . , and 24-n is wound around the stator segment cores 20-1, 202, . . . , and 20-n and the end cap assemblies 22-1, 22-2, and 22-n.

The stator segment core 20 includes a solid core or a stack of individual stator plates. The stator plates preferably have a shape identified at 30 in FIG. 1, although other shapes may be used. Each of the stator plates 30 includes an arcuate outer rim section 32 and a tooth-shaped pole section 34. An outer edge surface 36 of the outer rim section 32 is shaped for mating with an inner wall surface 38 of the housing 12. An inner edge surface of the outer rim section 32 is usually arcuate, and is generally concentric with the outer edge surface 36. The outer rim section 32 optionally includes a tongue projection 40 formed on one edge surface and a groove 42 on its opposite edge surface. The pole section 34 of the stator plates has an arcuate inner edge surface 44 and a pair of circumferentially-extending projections 46.

Each end cap assembly 22 may be individually molded and then attached to the stator core 20 using mechanical fasteners, adhesive, or other suitable fasteners. Alternately, the stator plates 30 can be stacked to form a first stator core 20 and the end cap assembly 22 can be overmolded onto the stator core 20. Alternately, multiple stator cores 20 for the stator segment assemblies can be inserted into a jig and multiple end cap assemblies can be overmolded at the same time. Still other methods of assembling the stator segment assemblies will be apparent to skilled artisans.

The rotor 16 includes a circular rim section 54 and a plurality of permanent magnets 56 that are attached along the rim section 54. A circular bore 58 is formed in the rotor 16. A rotor shaft (not shown) is received by the circular bore 58 of the rotor 16. In the particular embodiment shown, the rotor 16 has eight equally-spaced permanent magnets 56 and the segmented stator 14 has twelve equally-spaced pole sections. Other rotor pole and stator pole combinations are also contemplated. In addition, the permanent magnets 56 have an arcuate outer edge surface 62 that defines an air gap 63 with respect to the arcuate inner edge surface 44 on the pole sections 34 of the stator plates. The end cap assemblies 22 may employ IDC connectors for connecting the phase wires to the winding wires, as will be detailed below.

Figure 3:
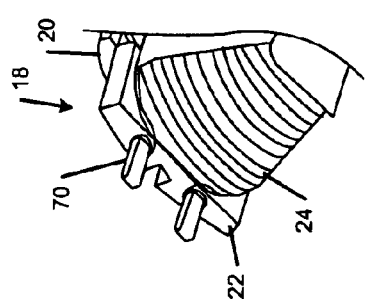
FIG. 3 is a perspective view of terminals of a stator segment assembly for connecting the phase wires to the stator segment assemblies using a phase wire stitching machine.

Referring now to FIG. 3, the winding wire 24 is connected to and/or wrapped around terminals 70 located on the stator segment assemblies 18. The phase wires are connected to and/or wrapped around the terminals 70 by a phase wire stitching machine. Electrical connections to the terminal 70 can be made with dip solder, micro flame solder, ultrasonic welding, resistance welding, or any other suitable method.

Figure 4:
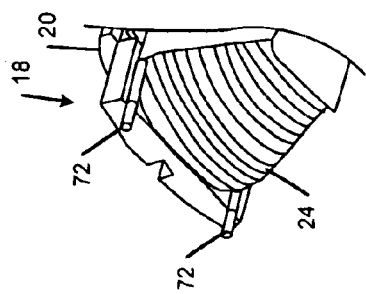
FIG. 4 is a perspective view of a stator segment assembly including winding wire for connecting the phase wires to the stator segment assemblies using a phase wire stitching machine.

Referring now to FIG. 4, ends 72 of the winding wire 24 on the individual stator segment assemblies 18 serve as a terminal. The phase wires are connected to and/or wrapped around the winding wire 24. This approach is particularly useful for heavy wire designs such as low voltage DC electric machines, which have a wire sizes that are sufficiently stiff to be used as a terminal. The phase wire can be approximately the same size as the winding wire 24. Alternately, the phase wire can include multiple strands of wire to facilitate the wrapping, connecting, and/or routing of the phase wire.

Figure 5A:
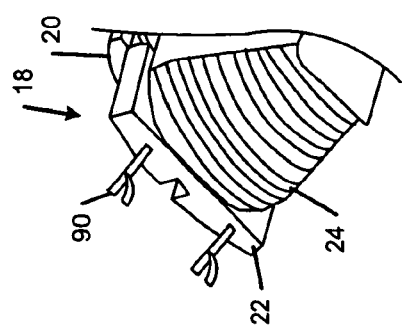
FIGS. 5A and 5B illustrate hook terminals of a stator segment assembly for connecting the phase wires to the stator segment assemblies using a phase wire stitching machine.
Figure 5B:
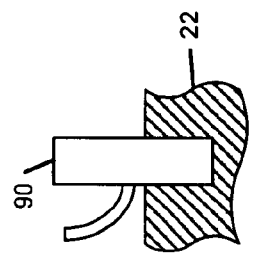

Referring now to FIGS. 5A and 5B, the connections to the winding wire 24 are made with hook terminals 90. The hook terminals 90 serve as a wrap for the winding wire 24 and the phase wires. The hook terminals preferably make a connection with the winding wires 24 using a resistive weld in a manner that is similar to a brush DC armature. Magnet wire stripping is not required for this process. Hook terminals are well suited for motors with heavier wire size that can not use insulation displacement devices (IDCs).

Figure 6:
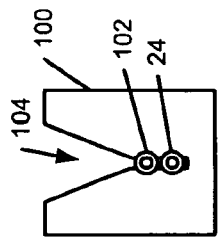
FIG. 6 illustrates a single-sided IDC of a stator segment assembly for connecting the phase wires to the stator segment assemblies using a phase wire stitching machine.
Figure 7:
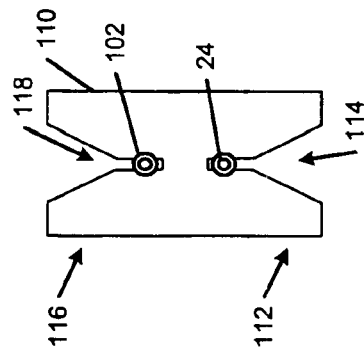
FIG. 7 illustrates an alternate double-sided IDC of a stator segment assembly for connecting the phase wires to the stator segment assemblies using a phase wire stitching machine.

In FIGS. 6 and 7, the connection to the winding wire 24 of the stator segment assemblies 18 is made using single-sided and double-sided insulation displacement devices (IDCs). In FIG. 6, a single-sided IDC 100 is used. The single-sided IDC 100 is formed integrally with or connected to the stator segment assemblies 18. Both the winding wire 24 and the phase wires 102 are inserted into a common pocket 104 for connection with a single-sided IDC 100.

In FIG. 7, a double-sided ICD 110 is shown. One side 112 of the IDC 110 is connected to the winding wire 24 (in pocket 114). After the stator segment assemblies 18 are assembled into the stator 14, the phase wire stitching machine connects the phase wires 102 to the other side of the ICD 110 (in pocket 118). Using these IDC approaches eliminates the need for wire stripping at the winding wire stage and the phase wiring stage.

Figure 8:
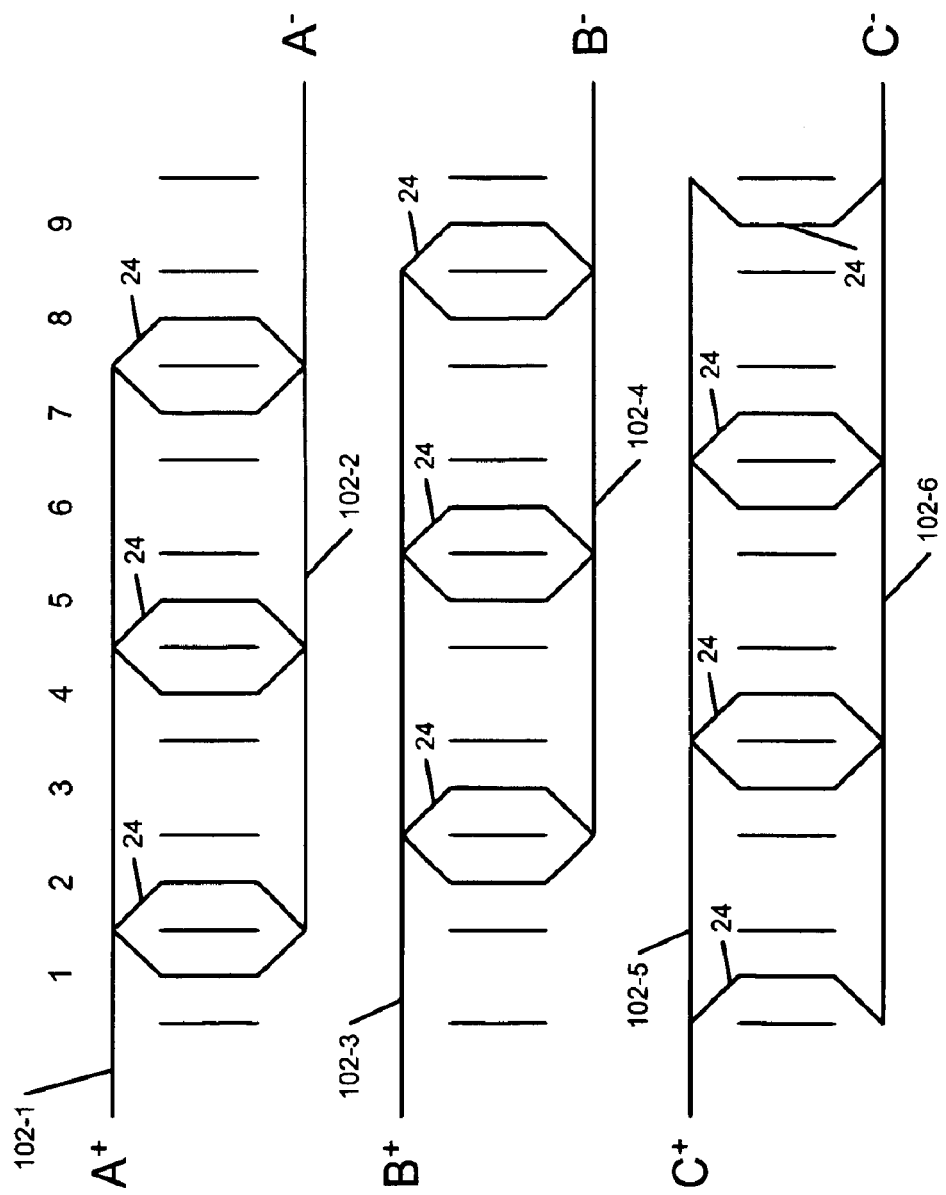
FIGS. 8 and 9 illustrates an exemplary stator and the connection of phase wires to winding wires.
Figure 9:
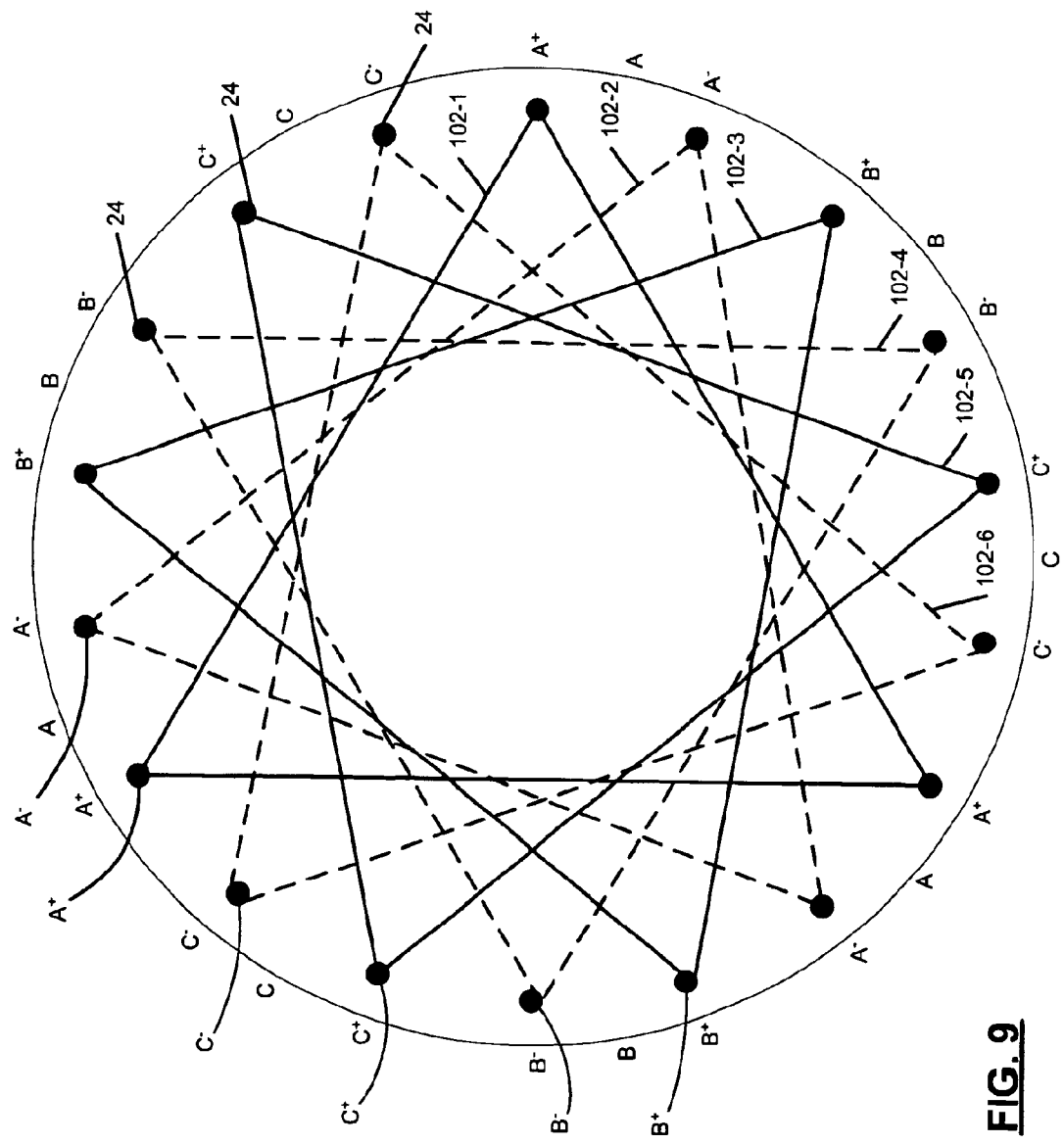
Figure 10C:
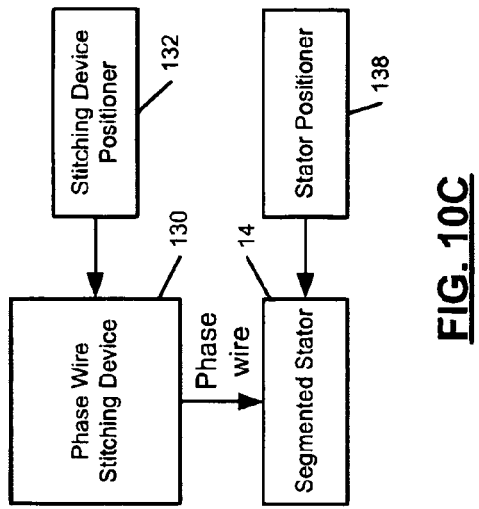
FIGS. 10A, 10B, and 10C illustrate positioning of the phase wire stitching device and/or the stator during stitching of the phase wires.
Figure 10A:
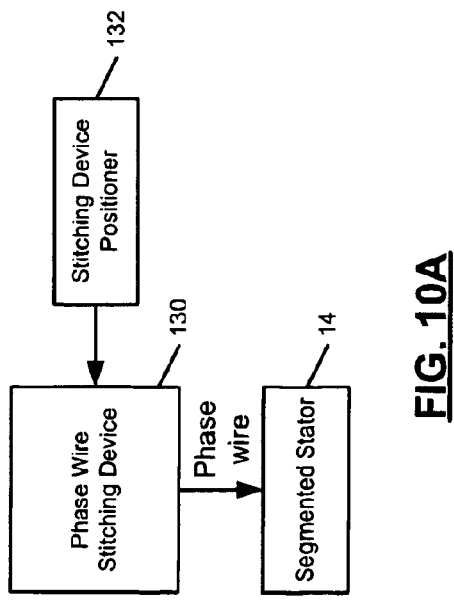
Figure 10B:
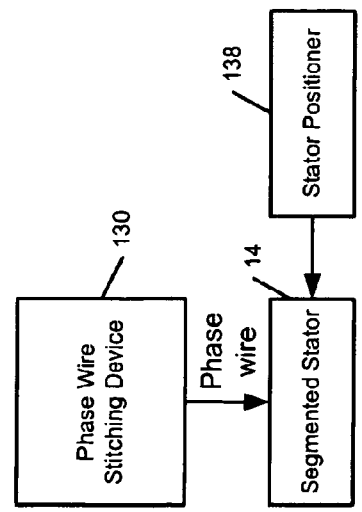

In FIGS. 8 and 9, phase wire 102-1, 102-2, . . . , and 102-6 and winding wire 24 connections for an exemplary six pole/nine slot electric machine are shown. In FIGS. 10A, 10B, and 10C, various ways of positioning a phase wire stitching device 130 and the segmented stator 14 are shown. In FIG. 10A, the phase wire stitching device 130 is positioned by a stitching device positioner 132 and the stator 14 is held stationary. In FIG. 10B, the phase wire stitching device 130 is stationary and the stator 14 is positioned by a stator positioner 138. In FIG. 10C, the phase wire stitching device 130 is positioned by a stitching device positioner 132 and the stator 14 is positioned by a stator positioner 138.

The routing of the phase wire 102 can be done in several different ways. The phase wires 102 can be routed around the back of the segment. The phase wires 102 can cross over on the inside of the stator 14. The phase wires 102 can be routed around the center bore with a retaining feature on the bore of the tooth segment. It is also possible to provide channels for separating the crossover phase wires if interphase isolation is desired.

The phase wire stitching device is similar to winding equipment that is used to wind the individual stator segment assemblies. In a preferred embodiment, the phase wire stitching device is a computer numerical controlled (CNC) machine. The mechanisms for wrapping the wire (and stripping if needed) are similar to the process for winding wire around the end cap assembly and the stator core. The movement from pin to pin or tooth to tooth with the phase wire is accomplished by moving the needle and/or the stator in a programmable fashion.

The throughput for the method according to the present invention is relatively high. The phase wire stitching device may have multiple needles and spindles. The time required to connect phase wires to a stator is sufficiently low for high volume production. The present invention dramatically reduces the cost of connecting the phase wires as compared to manual connection, PCBs, lead frames and other conventional solutions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of connecting phases of a segmented stator electric machine, comprising:
    providing a stator core;
    attaching an end cap assembly to said stator core;
    winding wire around said end cap assembly and said stator core to form a stator segment assembly;
    assembling a plurality of said stator segment assemblies into a stator; and
    using a phase wire stitching device to interconnect opposite ends of said winding wire of each of said stator segment assemblies to form first, second and third phases of said stator.

2. The method of claim 1 further comprising:
    attaching first and second terminals to said end cap assemblies of said stator segment assemblies;
    connecting said opposite ends of said winding wire to said first and second terminals; and
    connecting said phase wires to said first and second terminals.

3. The method of claim 1 further comprising adjusting a position of said phase wire stitching device relative to said stator while connecting said phase wires.

4. The method of claim 1 further comprising adjusting a position of said stator relative to said phase wire stitching device while connecting said phase wires.

5. The method of claim 1 further comprising adjusting a position of said stator and said phase wire stitching device while connecting said phase wires.

6. The method of claim 1 wherein said electric machine is a brushless permanent magnet electric machine.

7. The method of claim 1 wherein said electric machine is a switched reluctance electric machine.

8. A method of connecting phases of a segmented stator electric machine, comprising:
    providing a segmented stator electric machine including a plurality of stator segment assemblies, wherein said stator segment assemblies include a stator core, an end cap assembly and winding wire; and
    using a phase wire stitching machine to interconnect opposite ends of said winding wire of each of said stator segment assemblies to form first, second and third phases of said stator;
    attaching first and second terminals to said end cap assemblies of said stator segment assemblies;
    connecting said opposite ends of said winding wire to said first and second terminals; and
    connecting said phase wires to said first and second terminals using said phase wire stitching machine.

9. The method of claim 8 wherein said electric machine is a brushless permanent magnet electric machine.

10. The method of claim 8 wherein said electric machine is a switched reluctance electric machine.

* * * * *

UNITED STATES PATENT AND TRADEMARK OFFICE
CERTIFICATE OF CORRECTION

| | | |
|---|---|---|
| PATENT NO. | : 6,941,638 B2 | |
| APPLICATION NO. | : 10/193515 | |
| DATED | : September 13, 2005 | |
| INVENTOR(S) | : Richard E. Hartsfield, Jr. et al. | |

It is certified that error appears in the above-identified patent and that said Letters Patent is hereby corrected as shown below:

Column 3,
Line 50, "202" should be --20-2--.

Signed and Sealed this

Sixteenth Day of January, 2007

JON W. DUDAS
*Director of the United States Patent and Trademark Office*